(12) United States Patent
Majgaonkar et al.

(10) Patent No.: US 11,499,763 B2
(45) Date of Patent: Nov. 15, 2022

(54) INTEGRATED OIL SEPARATOR WITH A CONDENSER

(71) Applicant: Carrier Corporation, Palm Beach Gardens, FL (US)

(72) Inventors: Amey Sharad Majgaonkar, Haryana (IN); Elvin Kumar, Haryana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 152 days.

(21) Appl. No.: 17/111,052

(22) Filed: Dec. 3, 2020

(65) Prior Publication Data

US 2021/0302080 A1  Sep. 30, 2021

(30) Foreign Application Priority Data

Mar. 31, 2020  (IN) .............................. 202011014390

(51) Int. Cl.
*F25B 43/02*   (2006.01)
*B23P 15/26*   (2006.01)

(52) U.S. Cl.
CPC .............. *F25B 43/02* (2013.01); *B23P 15/26* (2013.01)

(58) Field of Classification Search
CPC .... F25B 43/02; F25B 39/04; F25B 2339/046; B23P 15/26
See application file for complete search history.

(56) References Cited

U.S. PATENT DOCUMENTS

| 5,704,215 A | 1/1998 | Lord et al. |
| 2006/0123833 A1* | 6/2006 | Flanigan ................. F25B 43/02 62/470 |

FOREIGN PATENT DOCUMENTS

CN          104697225 A       6/2015

* cited by examiner

*Primary Examiner* — Lee A Holly
(74) *Attorney, Agent, or Firm* — Cantor Colburn LLP

(57) ABSTRACT

A method of manufacturing a condenser with an integrated oil separator. An oil separator bottom plate is fixed with oil separator components in a first condenser dome shell. The oil separator bottom plate is welded using a first longitudinal seam welding and a second longitudinal seam welding. The first condenser dome shell with the oil separator components is coupled with the second condenser dome shell using a third longitudinal seam welding and a fourth longitudinal seam welding to form the condenser with the integrated oil separator.

20 Claims, 7 Drawing Sheets

INTEGRATED OIL SEPARATOR WITH A CONDENSER

CROSS-REFERENCE TO RELATED APPLICATIONS

This application claims priority to Indian Patent Application No. 202011014390, filed Mar. 31, 2020, the contents of which are incorporated by reference herein in their entirety.

TECHNICAL FIELD OF INVENTION

The present invention generally relates to heating, ventilation, and air conditioning (referred hereinafter as "HVAC") system. More particularly, the invention relates to a method of manufacturing an integrated oil separator for refrigeration systems.

BACKGROUND OF THE INVENTION

Chillers generate chilled water which is used to provide air conditioning in buildings. Chillers operate on vapor compression refrigeration cycle and include compressors. Oil is used in compressors for lubrication, cooling, sealing, silencing (reducing pressure pulsation) & for auxiliary functions. Oil is mixed with the refrigerant in compressors. However, oil needs to be separated from the refrigerant to improve the reliability & efficiency of the refrigeration system. For the purpose of separation of the oil & refrigerant, oil separators are installed on the compressor discharge line before the condenser. They usually comprise of a vessel with the discharge gas (refrigerant & oil mixture) inlet connection/s and refrigerant gas outlet connection/s & oil outlet connection/s. The separated refrigerant is supplied to condenser and separated oil is returned to the compressor.

Oil separators may be external which are placed outside the condenser or internal which are placed inside the condenser.

In the existing internal oil separators, oil separator assembly is separately manufactured as an independent vessel and is inserted inside the condenser shell. For this purpose, a separate sheet metal dome is required. There are several challenges in the current design of the internal oil separators. For instance, fitting of the oil separator inside a condenser shell is difficult as the oil separator tends to bend. Moreover, matching the nozzle locations of the oil separator and the condenser shell is difficult. Since the oil separator needs to be welded inside the condenser shell, there is also a possibility of welding damage/leakage as oil separator sheet metal thickness is small. Further, there is always some space between oil separator dome and condenser shell. This can result in high noise and vibrations while the refrigeration system is in operation.

In view of the afore-mentioned problems, there is a need of an efficient and effective system and a method for manufacturing an integrated oil separator with the condenser which alleviates the problems in the existing internal oil separators.

SUMMARY OF THE INVENTION

Various embodiments of the invention describe a method of manufacturing a condenser with an integrated oil separator. The method comprises fixing an oil separator bottom plate along with oil separator components in a first condenser dome shell. The method further comprises welding the oil separator bottom plate in the first condenser dome shell using a first longitudinal seam welding and a second longitudinal seam welding. The method further discloses coupling the first condenser dome shell with the second condenser dome shell by using a third longitudinal seam welding and a fourth longitudinal seam welding to form the condenser with the integrated oil separator.

In an embodiment of the invention, the oil separator bottom plate is welded in the upper portion of the first condenser dome shell.

In a different embodiment of the invention, the upper portion of the first condenser dome shell comprises an inlet for receiving a mixture of oil and refrigerant.

In an embodiment of the invention, the cross section of the first condenser dome shell coupled with the second condenser dome shell is circular and that of the integrated oil separator is semi-circular.

In another embodiment of the invention, the first, second, third, and fourth seam weldings use standardized grade material for welding.

In yet another embodiment of the invention, the condenser with the integrated oil separator is part of a refrigeration system.

In another embodiment of the invention, the refrigerant is separated from the oil in the integrated oil separator in the first condenser dome shell and passed to a condensing portion in bottom of first condenser dome shell and in the second condenser dome shell.

In still another embodiment of the invention, the oil separator has a common dome with the first condenser dome shell.

In a different embodiment of the invention, the oil is separated from the refrigerant due to collision of the mixture of oil and refrigerant against wall/s of the integrated oil separator and further under the influence of gravity. The oil is further separated from the refrigerant using wire meshes inside the integrated oil separator.

In another embodiment of the invention, the third longitudinal seam welding and the fourth longitudinal seam welding are applied at diagonally opposite ends to form a condenser from the first condenser dome shell and the second condenser dome shell.

Various embodiments of the invention describe an integrated oil separator with a condenser. The integrated oil separator with the condenser comprises an oil separator bottom plate fixed along with oil separator components in a first condenser dome shell and welding the oil separator bottom plate in the first condenser dome shell using a first longitudinal seam welding and a second longitudinal seam welding. A second condenser dome shell is coupled with the first condenser dome shell by using a third longitudinal seam welding and a fourth longitudinal seam welding. The condenser with the integrated oil separator is formed by welding the first condenser dome shell and the second condenser dome shell.

In an embodiment of the invention, the oil separator bottom plate is welded in the upper portion of the first condenser dome shell.

In a different embodiment of the invention, the upper portion of the first condenser dome shell comprises an inlet for receiving a mixture of oil and refrigerant.

In yet another embodiment of the invention, the cross section of the first condenser dome shell coupled with the second condenser dome shell is circular and that of the integrated oil separator is semi-circular.

In yet another embodiment of the invention, the first, second, third, and fourth seam weldings use standardized grade material for welding.

In another embodiment of the invention, the integrated oil separator with the condenser are part of a refrigeration system.

In yet another embodiment of the invention, the refrigerant is separated from the oil in the integrated oil separator in the first condenser dome and passed to a condensing portion/s in bottom of first condenser dome shell or in the second condenser dome shell.

In another embodiment of the invention, the oil separator has a common dome with the first condenser dome shell.

In an embodiment of the invention, the oil is separated from the refrigerant due to collision of the mixture of oil and refrigerant against wall/s of the integrated oil separator and further under the influence of gravity. The oil is further separated from the refrigerant using wire meshes inside the integrated oil separator.

In another different embodiment of the invention, the third longitudinal seam welding and the fourth longitudinal seam welding are applied at diagonally opposite ends to form a condenser from the first condenser dome shell and the second condenser dome shell.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Figure 1:
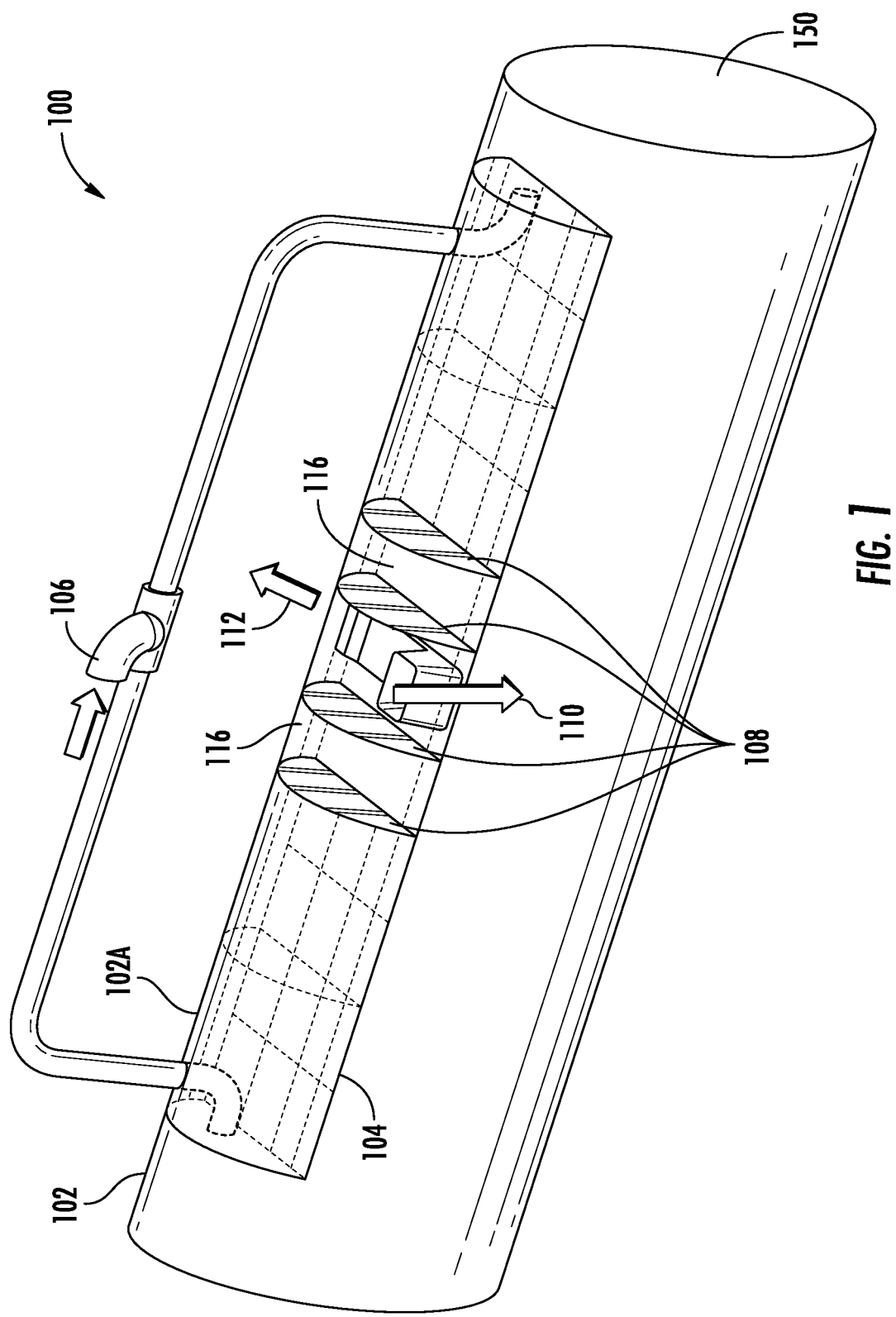
FIG. 1 depicts an exemplary architecture of an internal oil separator used with refrigerant condenser. An oil separator is manufactured separately and is inserted inside the condenser shell.

Described herein is a technology with a method to manufacture a condenser with an integrated oil separator. The condenser is manufactured with an oil separator which is integrated within the condenser body. The integration of the oil separator within the body of the condenser is advantageous since the pressure difference between the flow of fluid in the condenser and the oil separator is minimal. Moreover, this leads to saving the space of the system. Additional external discharge piping & associated pressure drop is eliminated which increase the efficiency of the system.

As described herein, a first condenser dome shell and a second condenser dome shell to form a condenser body are manufactured. In the first condenser dome shell, inlet/s for the oil and refrigerant mixture is/are provided. Other suitable connections are provided on the first condenser dome shell and the second condenser dome shell. Further, an oil separator bottom plate is manufactured to be fitted inside the first condenser dome shell. Various other components of the oil separator are assembled between the dome of the first condenser dome shell and the oil separator bottom plate. In an exemplary embodiment, the first condenser dome shell and the second condenser dome shell have semicircular cross section. The first and the second condenser dome shells may be combined to form a condenser dome shell with a circular cross section.

As described herein, the different components of the oil separator may be integrated with first condenser dome shell. In the invention, the oil separator has a common dome with the first condenser dome shell. The first condenser dome shell is manufactured by rolling a plate into semicircular shape. The central axis and nozzle locations are marked & corresponding holes are made on the first condenser dome shell. The first condenser dome shell is placed on fixture in inverted position so that the oil separator components can be easily assembled inside it. The main oil separator components are refrigerant & oil mixture inlet connection/s, end plates, demister pads, demister support brackets, refrigerant & oil outlet connections and oil separator bottom plate. In case of oil separator with internal flow distribution, the flow distributor plate can also be assembled. In case we wish to provide the oil pressure sensor, oil level sensor then provisions for it can also be made on first condenser shell. A provision for pressure relief valve connection is also made on first condenser dome shell. The assembly sequence can be kept flexible to address ease of manufacturing and quality aspects but generally, the different components of the oil separator are placed inside the first condenser dome shell before the oil separator bottom plate is fixed with the first condenser dome shell. The first and second condenser dome shells are welded to form integral oil separator with condenser.

As described herein the first condenser dome shell and the second condenser dome shell are manufactured from materials such as metals and alloys. For example, the materials used for condenser dome shell may be nickel alloy, brass, titanium, stainless steel, and ferritic stainless steel and the like. Further, the oil separator bottom plate and different components of the oil separator are welded with the first condenser dome shell. Moreover, the first condenser dome shell and the second condenser dome shell are also welded. The welding may be done to comply with American Society of Mechanical Engineers (ASME) standard which is well known in the art or any other pressure vessel code/standard.

Different features of the invention are described with reference to figures as described below.

Turning now to Figures and drawings, FIG. 1 describes a typical internal oil separator with refrigerant condenser 100 where the oil separator is manufactured separately and inserted inside the condenser shell 150. The oil separator has an oil and refrigerant mixture inlet 106. The entry of the oil and refrigerant mixture from the inlet may happen from a single entry or a double entry. FIG. 1 depicts the oil separator with a double entry with the entry point at both ends of a dome 102A of the oil separator. The oil is separated from the refrigerant by change of flow direction, impingement, reduction of velocity, gravity settling and filtering the oil from the refrigerant using demister pads/wire mesh 116 enclosed in mesh support brackets 108. The description of the oil separator components & their functions is known to a person skilled in the art and not explained herein for brevity. The refrigerant is discharged into condenser from outlet 110 and the oil is returned to compressor from the bottom outlet 112. The oil separator comprises a dome 102A and the bottom flat portion 104.

Figure 2:
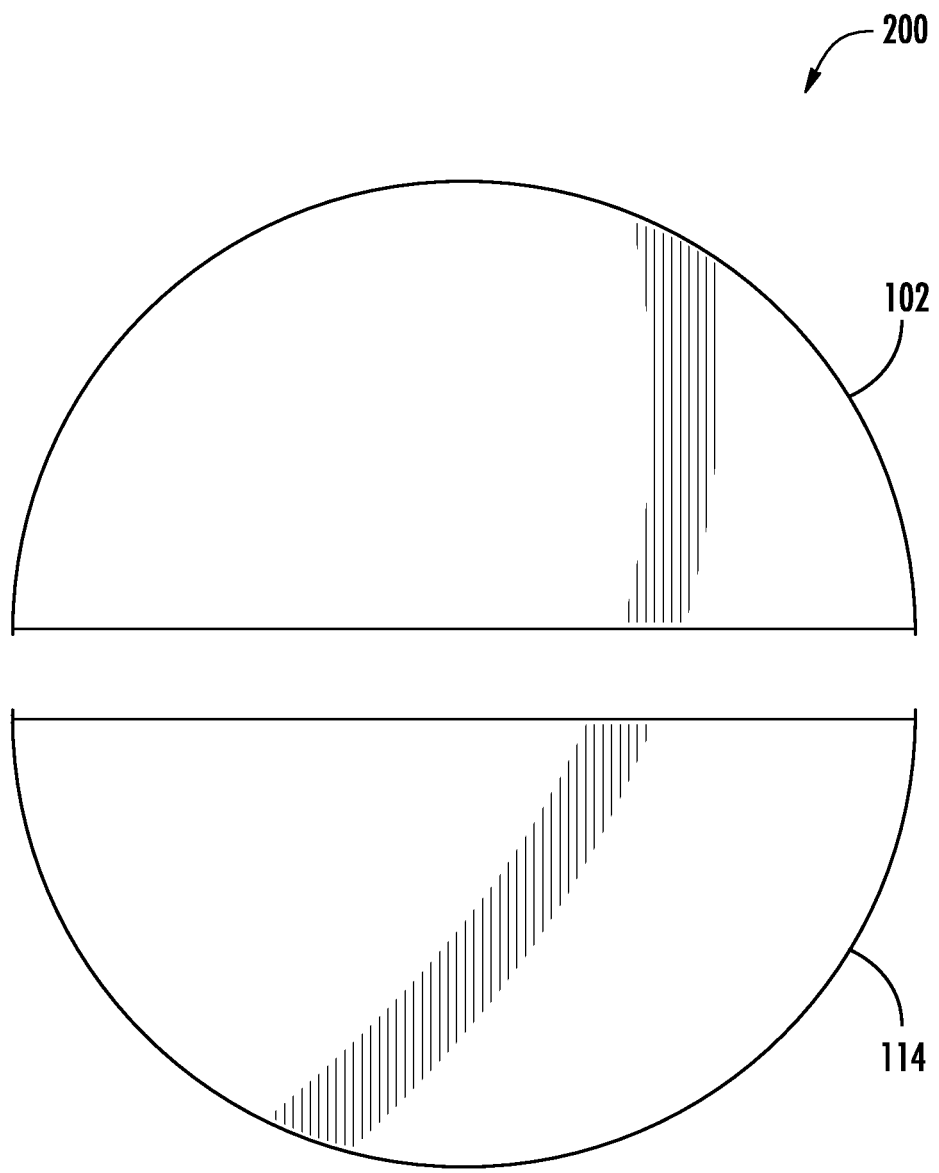
FIG. 2 depicts sliced cross-sectional view of the first condenser dome shell and the second condenser dome shell in accordance with an exemplary embodiment of the invention.

FIG. 2 depicts a cross sectional view of the condenser sliced longitudinally. A first condenser dome shell 102 and a second condenser dome shell 114 are manufactured and are coupled with each other to form a condenser dome shell. In the invention, a first condenser dome shell 102 also acts as an oil separator dome 102A as shown in FIG. 1 above.

In exemplary embodiments the first condenser dome shell 102 and the second condenser dome shell 114 can be manufactured from the same material or can be manufactured from different materials. Further, the first condenser dome shell 102 may be referred as upper portion of the condenser dome and the second condenser dome shell 114 may be referred as lower portion of the condenser dome. In an embodiment of the invention, the cross section of each of the first condenser dome shell 102 and the second condenser dome shell 114 is semi-circular. The first condenser dome shell 102 and the second condenser dome shell 114 are welded with each other by welding both ends of each condenser dome shell.

Figure 3:
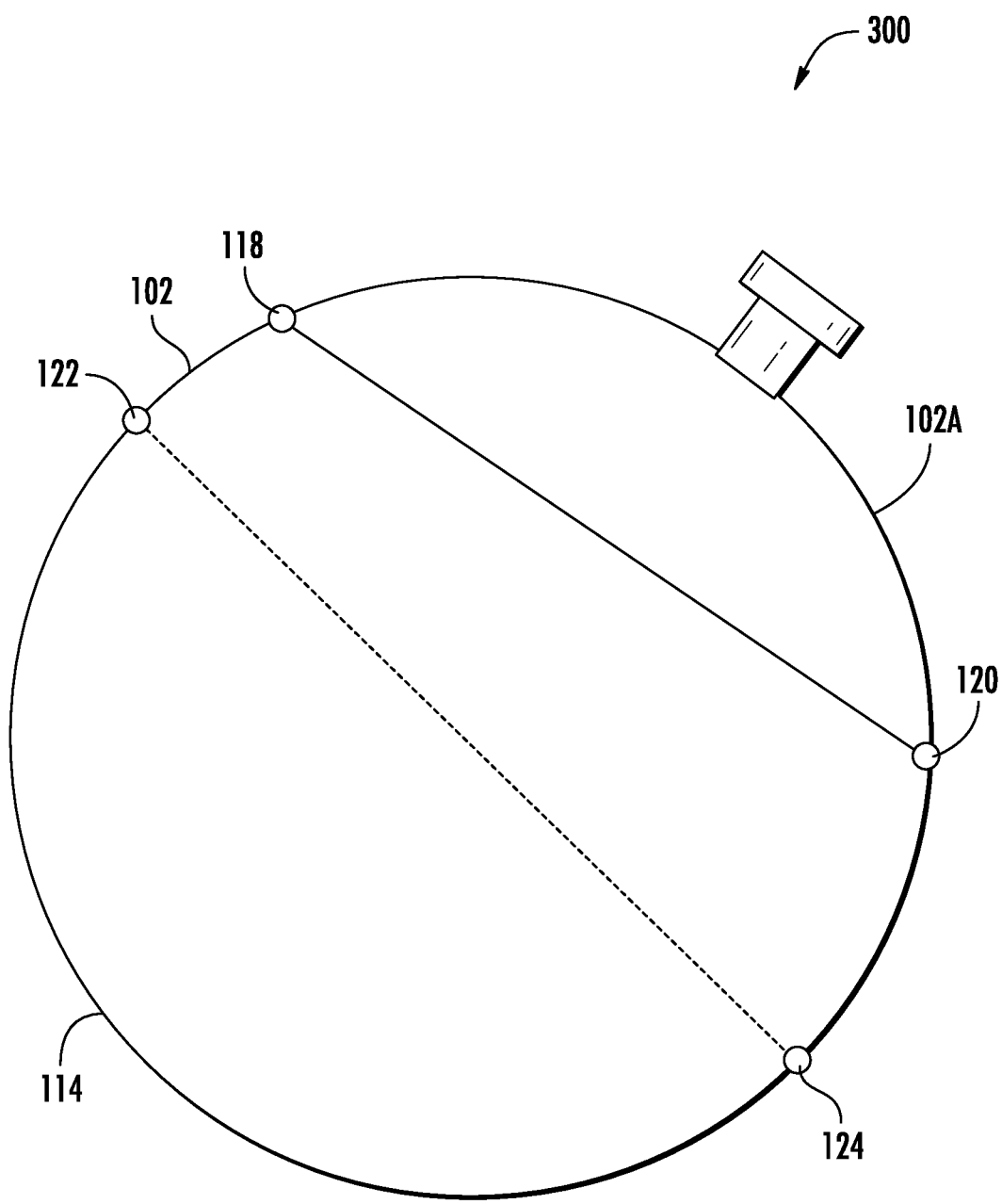
FIG. 3 depicts a transverse cross-sectional view of the different components of an integrated oil separator with the refrigerant condenser in accordance with an exemplary embodiment of the invention.

FIG. 3 depicts a transverse cross-sectional view 300 for integrating the oil separator inside the condenser. As discussed above, the first condenser dome shell 102 and the second condenser dome shell 114 are placed separately. The first condenser dome shell 102 is fixed with the oil separator components such as demister pads/wire mesh, end plates and the like. The oil separator bottom portion/plate 104 is inserted inside the first condenser dome shell 102 and welded using a first longitudinal seam welding 118 and a second longitudinal seam welding 120. The integrated oil separator is thus embedded inside the first condenser dome shell 102. After welding the oil separator bottom plate 104 with the first condenser dome shell 102, the second condenser dome shell 114 is welded with the first condenser dome shell 102 (with integrated oil separator) using the third seam welding 122 and the fourth seam welding 124, preferably but not limited to diagonally opposite ends to form a condenser from the first condenser dome shell and the second condenser dome shell. It is noted that the dome of first condenser dome shell 102 acts as the dome 102A of the oil separator. This is in contrast with the internal oil separators which are manufactured separately and then welded inside the condenser. The internal oil separator has separate sheet metal dome 102A and condenser shell 150 (as shown in FIG. 1) manufactured from plate material. The invention has first condenser dome shell 102 manufactured from plate material which acts as the dome 102A of the oil separator.

This embodiment of the invention is advantageous over the existing internal oil separators in that the oil separator is integrated with the condenser body. Further, the pressure difference between the condenser fluid and the oil separator fluid is minimal, no external piping and associated pressure drop happens which in turn improves efficiency of the refrigeration system. It is further advantageous that different suppliers are not required for manufacturing the oil separators and the condenser shells separately resulting in the lower cost of manufacturing and transportation. Moreover, since the oil separator dome and condenser dome shell are one and the same, matching of nozzle locations of oil separator and condenser dome shell is not required, making it easy to manufacture & reducing process time & improving quality. With the method of manufacturing disclosed above, no separate welding is required as oil separator is integral part of condenser. Furthermore, absence of welding the oil separator with the dome also results in lower noise and vibrations when the refrigeration system is working.

Figure 4:
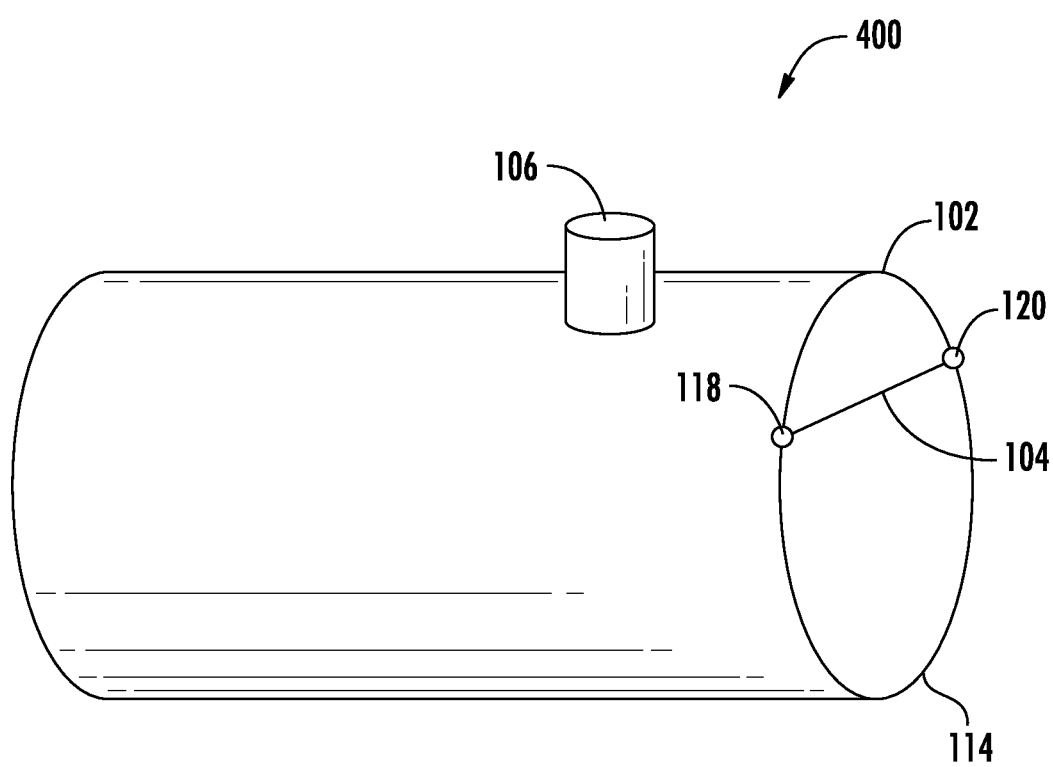
FIG. 4 depicts an external side view of an integrated oil separator with the condenser in accordance with an exemplary embodiment of the invention.

FIG. 4 describes a side view section of the integrated oil separator enclosed in the condenser formed based on the method as discussed above. As discussed above the first condenser dome shell 102 (with the integrated oil separator) is welded with the second condenser dome shell 114 to form a condenser 400. As depicted, externally an inlet for the oil and refrigerant mixture is shown. The lines 118 and 120 indicates the first seam welding and the second seam welding respectively.

Figure 5:
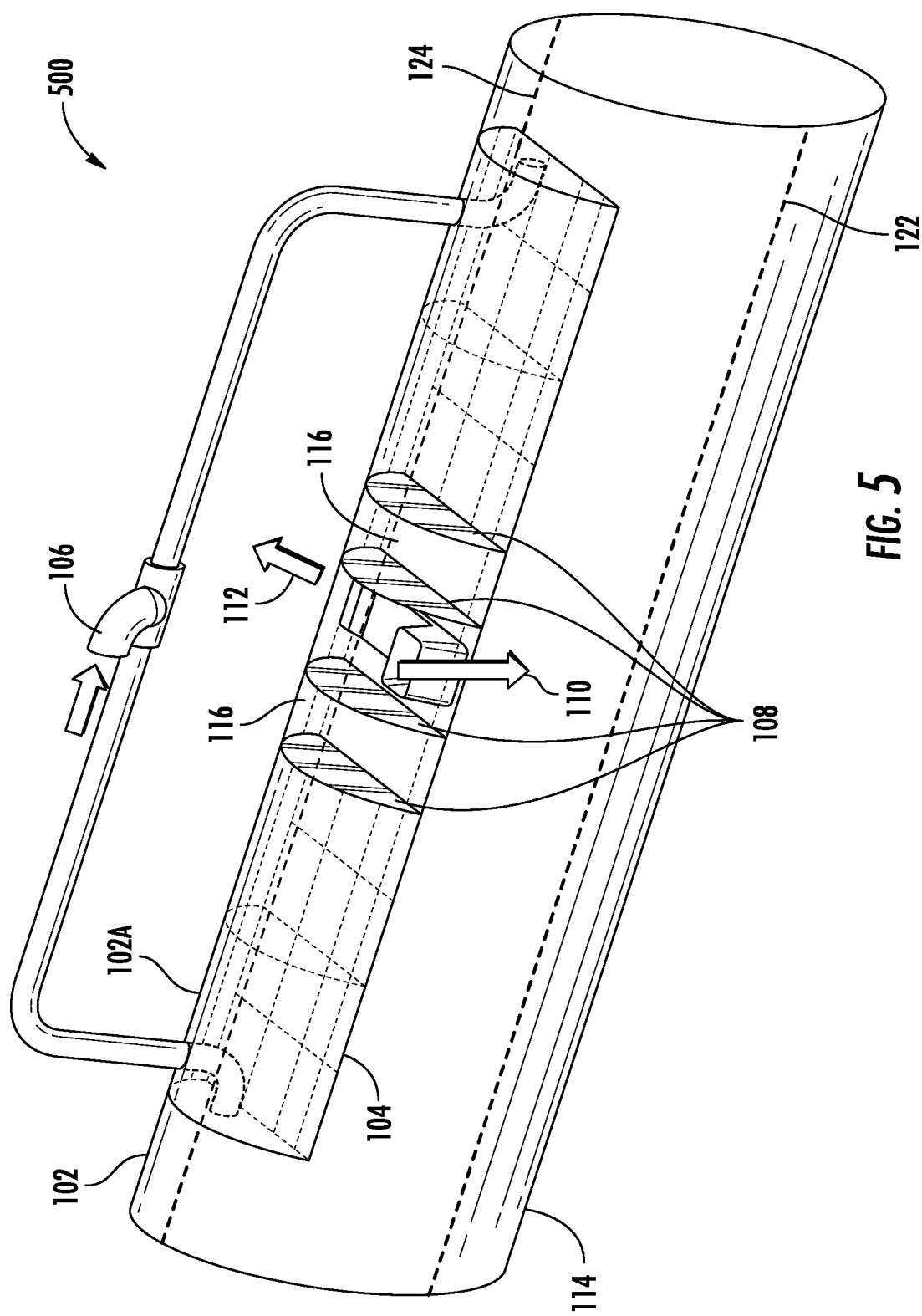
FIG. 5 depicts an exemplary architecture of an integral oil separator used with refrigerant condenser. An oil separator is manufactured integral to condenser shell.

FIG. 5 describes a typical integral oil separator with refrigerant condenser 500. The oil separator is manufactured integral to the condenser shell. The oil separator has an oil and refrigerant mixture inlet 106. The entry of the oil and refrigerant mixture from the inlet may happen from a single entry or a double entry. FIG. 5 depicts the oil separator with a double entry with the entry point at both ends of a dome 102 of the oil separator. The oil is separated from the refrigerant by change of flow direction, impingement, reduction of velocity, gravity settling and filtering the oil from the refrigerant using demister pads/wire mesh 116 enclosed in mesh support brackets 108. The description of the oil separator components & their functions is known to a person skilled in the art and not explained herein for brevity. The refrigerant is discharged into condenser from outlet 110 and the oil is returned to compressor from the bottom outlet 112. The oil separator comprises a dome 102 common with the first condenser dome shell and the bottom flat portion 104.

Figure 6:
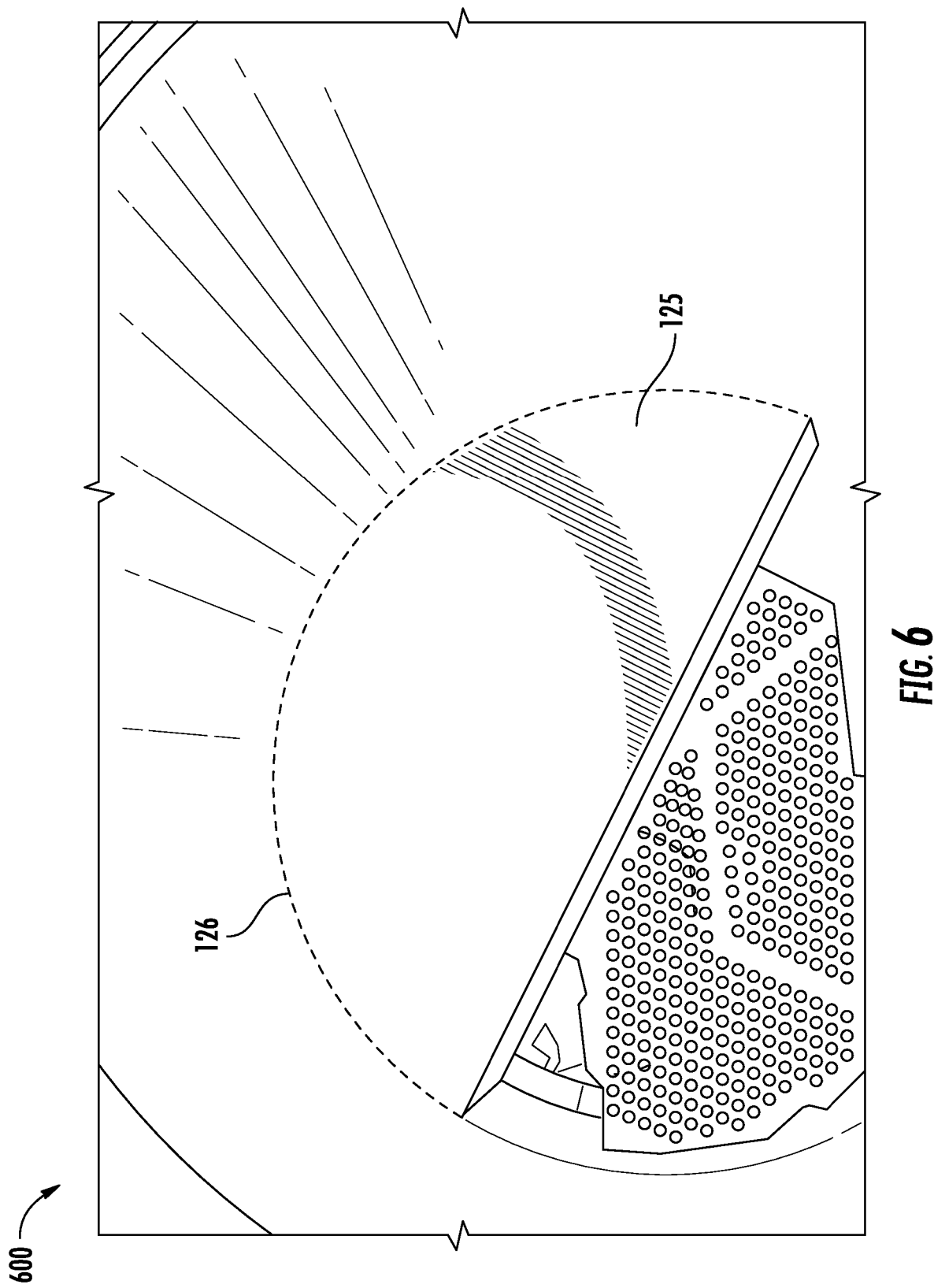
FIG. 6 depicts an expected industrial view of an integrated oil separator with the condenser in accordance with an exemplary embodiment of the invention.

FIG. 6 depicts an expected pictorial view of the industrial integrated oil separator with the condenser. The condenser 600 is formed by combining or welding the first condenser dome shell 102 and the second condenser dome shell 114. The dome of the condenser and that of oil separator is same as depicted. the oil separator end plate 125 is welded inside the condenser 600 by weld line 126.

Figure 7:
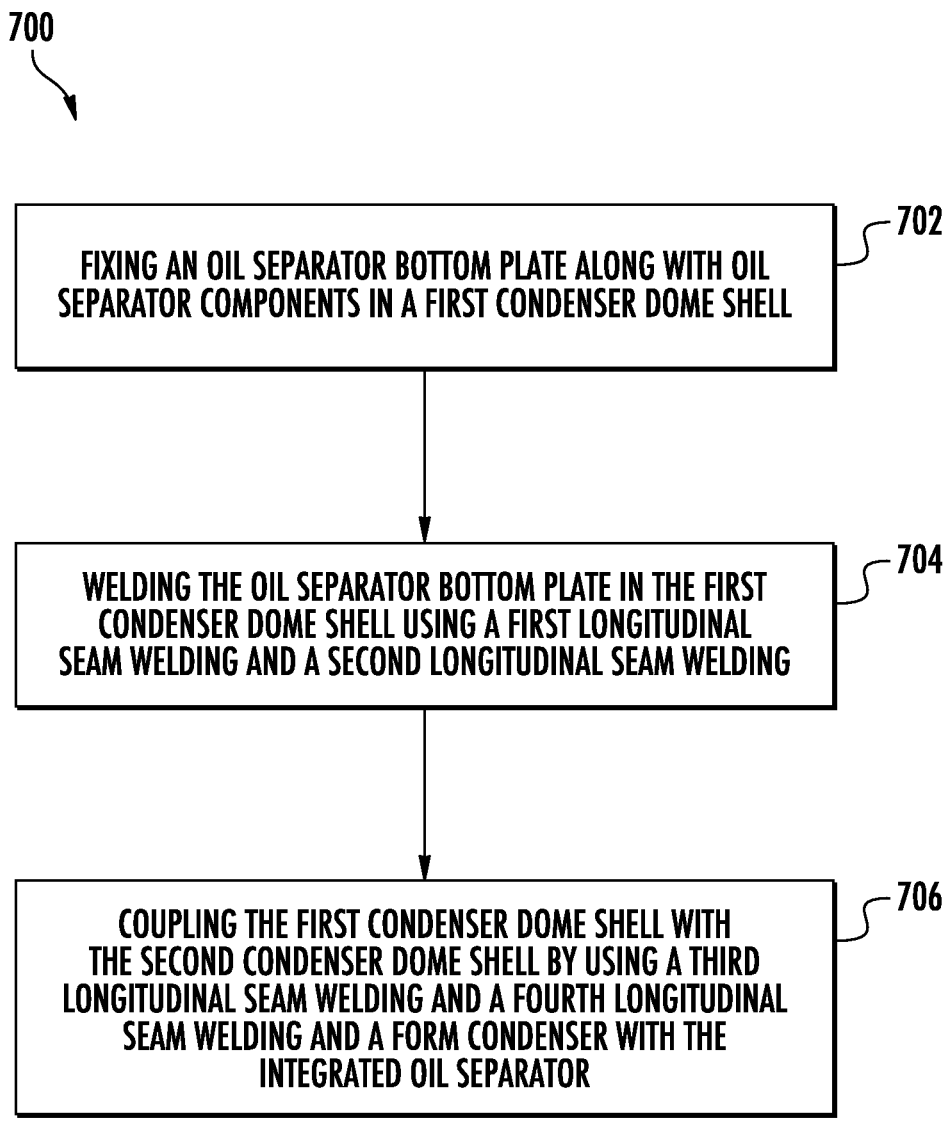
FIG. 7 depicts an exemplary flowchart illustrating a method to perform the invention according to an exemplary embodiment of the invention.

FIG. 7 depicts a flowchart outlining the features of the invention in an exemplary embodiment of the invention. The method flowchart 700 describes a method being performed to manufacture an integrated oil separator with a condenser for effective efficiency of the refrigeration system. The method starts at 702 by fixing an oil separator bottom plate 104 along with the oil separator components in a first condenser shell 102 as described with respect to FIGS. 2-6 above.

At step 704, the oil separator portion/plate 104 is welded with the first condenser dome shell 102 using a first longitudinal seam welding 118 and a second longitudinal seam welding 120. The same is described above with reference to FIG. 3 above.

At step 706, the first condenser dome shell 102 (with integrated oil separator) is welded with the second condenser dome shell 114 by using a third seam welding 122 and a fourth seam welding 124. The coupling of the first condenser dome shell 102 with the second condenser dome shell 114 results in a condenser with an integrated oil separator. This has been discussed in greater details in FIGS. 2-6 above.

The present invention is applicable in various industries/fields such as, but is not limited to, hospitality industry, residential complexes, offices, universities, hospitals, colleges, homes and any such industry/field that is well known in the art and where the HVAC systems are used.

The embodiments of the invention discussed herein are exemplary and various modification and alterations to a person skilled in the art are within the scope of the invention. Though the present invention has been described considering an exemplary refrigeration system, still the invention is applicable to all the condensers which can incorporate the internal oil separators.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of" The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method of manufacturing a condenser with an integrated oil separator, the method comprising:
    fixing an oil separator bottom plate along with oil separator components in a first condenser dome shell;
    welding the oil separator bottom plate in the first condenser dome shell using a first longitudinal seam welding and a second longitudinal seam welding; and
    coupling the first condenser dome shell with a second condenser dome shell by using a third longitudinal seam welding and a fourth longitudinal seam welding to form the condenser with the integrated oil separator.

2. The method according to claim 1, wherein the oil separator bottom plate is welded in the upper portion of the first condenser dome shell.

3. The method according to claim 2, wherein the upper portion of the first condenser dome shell comprises an inlet for receiving a mixture of oil and refrigerant.

4. The method according to claim 3, wherein the refrigerant is separated from the oil in the integrated oil separator in the first condenser dome shell and passed to a condensing portion in the second condenser dome shell.

5. The method according to claim 3, wherein the oil is separated from the refrigerant due to collision of the mixture of oil and refrigerant against a wall of the integrated oil separator and further under the influence of gravity, wherein the oil is further separated from the refrigerant using a wire mesh inside the integrated oil separator.

6. The method according to claim 1, wherein the cross section of the first condenser dome shell coupled with the second condenser dome shell is circular and that of the integrated oil separator is semi-circular.

7. The method according to claim 1, wherein the first, second, third, and fourth seam weldings use standardized grade material for welding.

8. The method according to claim 1, wherein the condenser with the integrated oil separator is part of a refrigeration system.

9. The method according to claim 1, wherein the oil separator has a common dome with the first condenser dome shell.

10. The method according to claim 1, wherein the third longitudinal seam welding and the fourth longitudinal seam welding are applied at diagonally opposite ends to form a condenser from the first condenser dome shell and the second condenser dome shell.

11. An integrated oil separator with a condenser comprising:
    an oil separator bottom plate fixed along with oil separator components in a first condenser dome shell and welding the oil separator bottom plate in the first condenser dome shell using a first longitudinal seam welding and a second longitudinal seam welding;
    a second condenser dome shell coupled with the first condenser dome shell by using a third longitudinal seam welding and a fourth longitudinal seam welding;
    wherein the condenser with the integrated oil separator is formed by welding the first condenser dome shell and the second condenser dome shell.

12. The integrated oil separator with the condenser according to claim 11, wherein the oil separator bottom plate is welded in the upper portion of the first condenser dome shell.

13. The integrated oil separator with the condenser according to claim 12, wherein the upper portion of the first condenser dome shell comprises an inlet for receiving a mixture of oil and refrigerant.

14. The integrated oil separator with the condenser according to claim 13, wherein the refrigerant is separated from the oil in the integrated oil separator in the first condenser dome and passed to a condensing portion in the second condenser dome shell.

15. The integrated oil separator with the condenser according to claim 13, wherein the oil is separated from the refrigerant due to collision of the mixture of oil and refrigerant against a wall of the integrated oil separator and further under the influence of gravity, wherein the oil is further separated from the refrigerant using a wire mesh inside the integrated oil separator.

16. The integrated oil separator with the condenser according to claim 11, wherein the cross section of the first condenser dome shell coupled with the second condenser dome shell is circular and that of the integrated oil separator is semi-circular.

17. The integrated oil separator with the condenser according to claim 11, wherein the first, second, third, and fourth seam weldings use standardized grade material for welding.

18. The integrated oil separator with the condenser according to claim 11, wherein the integrated oil separator with the condenser are part of a refrigeration system.

19. The integrated oil separator with the condenser according to claim 11, wherein the oil separator has a common dome with the first condenser dome shell.

20. The integrated oil separator with the condenser according to claim 11, wherein the third longitudinal seam welding and the fourth longitudinal seam welding are applied at a diagonally opposite ends to form a condenser from the first condenser dome shell and the second condenser dome shell.

* * * * *